(12) United States Patent
Gualtieri et al.

(10) Patent No.: US 11,969,761 B2
(45) Date of Patent: Apr. 30, 2024

(54) METHOD FOR DYNAMIC ANALYSIS OF PARCELS

(71) Applicant: Fameccanica.Data S.p.A., San Giovanni Teatino (IT)

(72) Inventors: Diego Gualtieri, San Giovanni Teatino (IT); Anselmo Cicchitti, San Giovanni Teatino (IT)

(73) Assignee: Fameccanica.Data S.p.A., San Giovanni Teatino Chieti (IT)

( * ) Notice: Subject to any disclaimer, the term of this patent is extended or adjusted under 35 U.S.C. 154(b) by 0 days.

(21) Appl. No.: 17/682,242

(22) Filed: Feb. 28, 2022

(65) Prior Publication Data
US 2022/0280979 A1    Sep. 8, 2022

(30) Foreign Application Priority Data
Mar. 5, 2021   (EP) .................................... 21161085

(51) Int. Cl.
*B07C 5/34* (2006.01)
*B07C 5/36* (2006.01)
*G01N 21/01* (2006.01)
*G01N 21/84* (2006.01)

(52) U.S. Cl.
CPC ................ *B07C 5/34* (2013.01); *B07C 5/361* (2013.01); *G01N 21/01* (2013.01); *G01N 21/84* (2013.01); *G01N 2021/8455* (2013.01)

(58) Field of Classification Search
CPC .................................. B07C 5/361; B07C 5/34
See application file for complete search history.

(56) References Cited

U.S. PATENT DOCUMENTS

| 10,815,069 B1 | 10/2020 | Elmardini | |
|---|---|---|---|
| 2015/0209831 A1* | 7/2015 | Wargo | B07C 7/00 209/539 |

FOREIGN PATENT DOCUMENTS

WO    2019222128 A1    11/2019

OTHER PUBLICATIONS

European Search Report dated Jul. 27, 2021. 5 pages.

* cited by examiner

*Primary Examiner* — Jacob S. Scott
*Assistant Examiner* — Miraj T. Patel
(74) *Attorney, Agent, or Firm* — RMCK Law Group PLC

(57) ABSTRACT

Disclosed herein is a method for dynamic analysis of parcels, particularly intended to be implemented within logistics facilities. The method achieves real time analysis of stability performance of the parcels before the parcels enter specific paths within the logistics facility, so that the paths can be chosen based of stability performance of the parcels determined through the method.

13 Claims, 2 Drawing Sheets

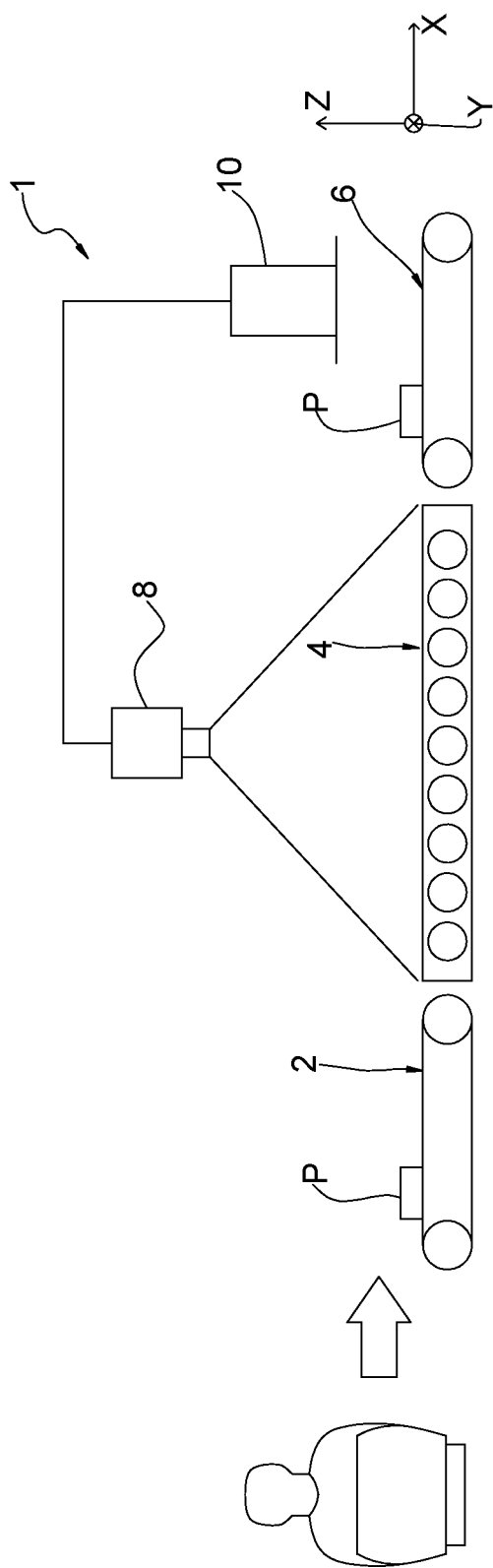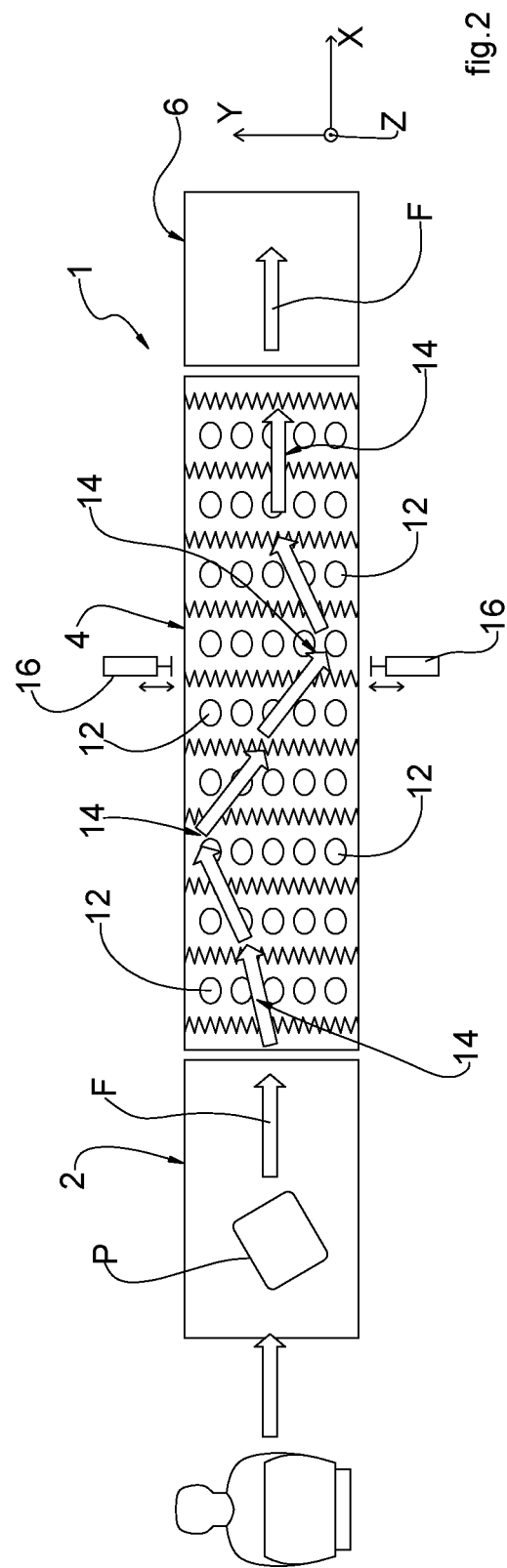

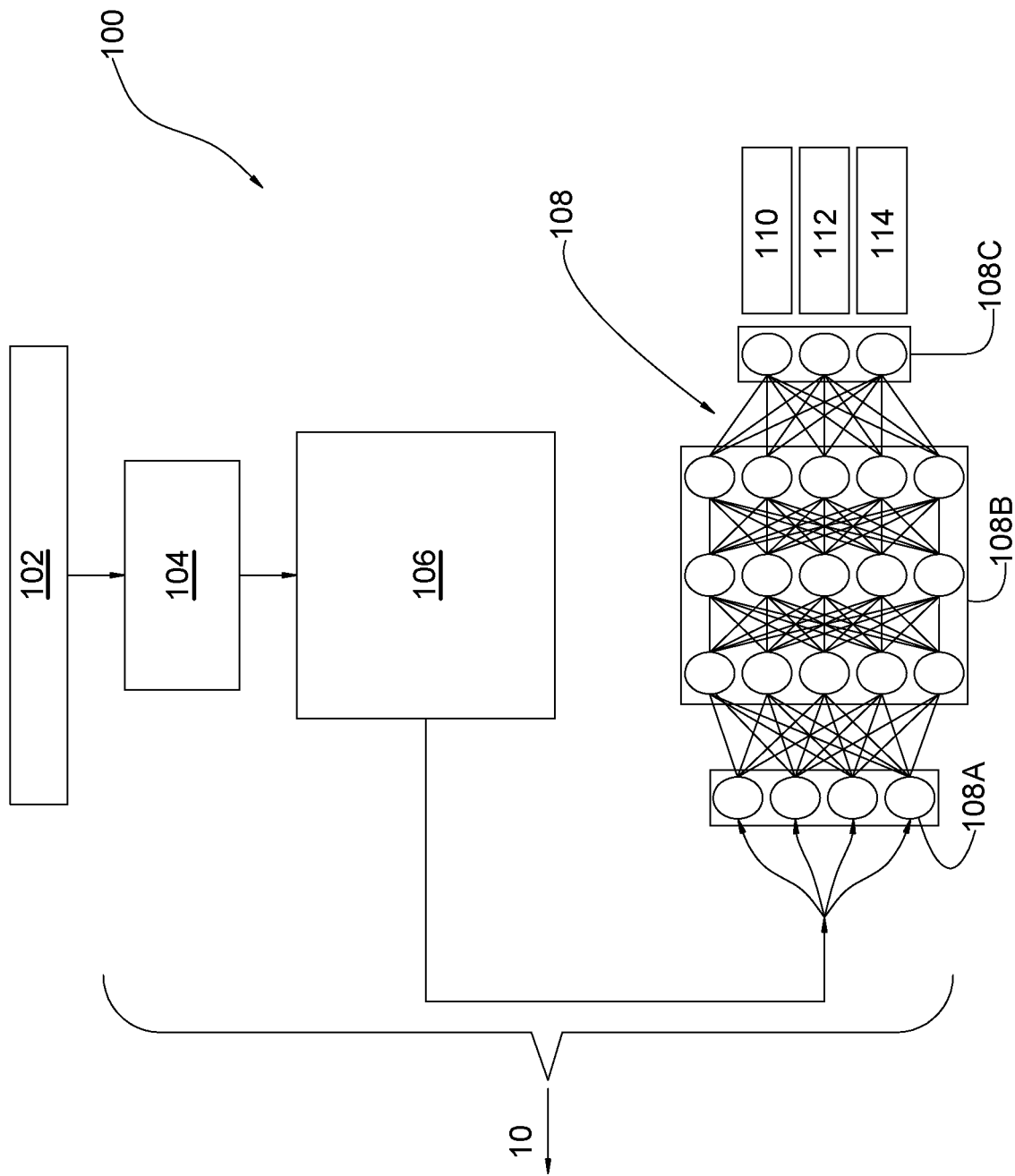

METHOD FOR DYNAMIC ANALYSIS OF PARCELS

CROSS-REFERENCE TO RELATED APPLICATION

This application claims priority to European Patent Application No. 21161085.2 filed Mar. 5, 2021. The disclosure of the above application is incorporated herein by reference in its entirety.

FIELD OF THE INVENTION

The present invention relates to logistics. More specifically, the present invention has been developed with specific reference to parcel handling within logistics facilities.

PRIOR ART

Parcel handling within logistics facilities typically begins with parcel drop off by a courier, wherein the parcels are the result of a collection before designated pick up sites (for instance, a home address of a sender).

Parcel drop off at the logistics facility typically occurs with no specific handling guidelines, whereby the parcels are inordinately laid onto an input conveyor and get sorted in further processing stages downstream of the input conveyor.

The parcels come in a variety of different sizes, shapes, weights, packaging/wrapping materials, volume-to-weight ratios, such that the essentially random drop off at the input conveyor does not allow to process the parcels the way they would require to ensure uniform and smooth sorting and transfer through the facility. Handling of the parcels inevitably incurs drops, shocks, rolls of the very parcels, as well as jamming of the processing devices—mostly conveyors and sorting machines—due to flip-overs, slips and sideslips of the parcels.

These phenomena are liable to reducing the overall efficiency of the handling facility, in that they require continuous monitoring and actions along the processing lines to compensate for the effects thereof, and are also liable to causing loss or mix-up of parcels.

OBJECT OF THE INVENTION

The object of the present invention is to solve the aforementioned technical problems. Particularly, the object of the present invention is to eliminate the disruptions in the handling of parcels due to the variance in parcel features without requiring any handling guideline at the parcel drop off.

SUMMARY OF THE INVENTION

The object of the invention is achieved by a method and a logistics facility having the features of the appended claims, which form an integral part of the technical disclosure provided herein in relation to the invention.

BRIEF DESCRIPTION OF THE FIGURES

Further features and advantages of the invention will become apparent from the following description with reference to the annexed drawings, provided purely by way of non-limiting example, and wherein:

FIG. 1 is a schematic representation of a logistics facility implementing the method of the invention FIG. 2 is a plan view of the logistics facility shown in FIG. 1, and FIG. 3 is a workflow chart representative of steps of the method of the invention.

DETAILED DESCRIPTION

Reference number 1 in FIG. 1 designates as a whole a logistics facility configured for implementing a method for dynamic analysis of parcels according to the invention. As indicated in the foregoing, FIG. 1 is to be intended as schematically representing the layout of an actual facility, meaning that each component or unit thereof may correspond to multiple, parallel or intervening arrangements within the facility.

The facility 1 includes an input conveyor 2, a testing facility (or test bed) 4 downstream of the input conveyor 2, and an output conveyor 6 downstream of the testing facility 4. The testing facility 4 is operatively associated to a tracking system 8, which is in turn operatively connected to a computer unit 10, preferably an AI server.

In preferred embodiments the input and output conveyors 2, 6 are of a conventional type, as they are mainly intended to feed one or more randomly placed parcels P to and out of the testing facility 4, respectively. The output conveyor 6 is in particular representative of a single conveyor, as well as all of the conveyor-based paths downstream of the testing facility 4. A parcel P within the meaning of the present disclosure encompasses essentially any item suitable for shipping (like courier delivered/deliverable parcels) or automated processing, such as containers, bottle containers or the like.

The general process of feed direction is indicated by the reference F in FIGS. 1 and 2, and it corresponds to the general parcel flow through the facility 1. Also represented in FIGS. 1 and 2 is an orthogonal reference system X-Y-Z wherein X designates a longitudinal direction, aligned with the general process or feed direction F, Y a transverse direction, and Z a vertical direction.

In preferred embodiments, with reference to FIG. 2, the testing facility 4 is configured as a controlled rolling surface including a matrix or an array (in general an arrangement) of rolling elements 12 that can be selectively operated to perform multi axis rotations, i.e. to rotate around axes of rotation that are selected based on the features of test path 14 that is to be negotiated by a parcel P moving through the testing facility 4. An example of this is an Activated Roller Belt® conveyor.

For example, the test path 14 show in FIG. 2 is represented as a substantially serpentine path, but other options may be practiced according to specific needs. The test path 14 is preferably chosen so to result in major local alterations to the general feed direction F as far as parcel motion is concerned. For instance, the test path 14 may feature—individually or in combination—abrupt changes in direction, tight bends, abrupt accelerations and decelerations, as well as slope variations, uni- or multi-directional. In general, the test path may include whatever combination of one or more bends, direction changes, acceleration changes, vibration inputs, and slope variations.

In embodiments, the testing facility 4 may be provided differently than shown in FIG. 2, for instance replacing the controlled rolling surface with a passive rolling surface, wherein rolling elements only move based on the interaction with the parcel P, i.e. the motion of the parcel P over the testing facility 4, and wherein one or more actuators are arranged on one or both sides of the testing facility 4. Note that the provision of actuators does not exclude the provision of a controlled rolling surface such as that disclosed in respect of FIG. 2: in this regard, FIG. 2 itself schematically reproduces a pair of actuators 16 arranged on opposite sides of the testing facility 4 to provide lateral (transverse) test actions on the parcels P negotiating the test path 14, or else vertical test actions to impart a vibrational motion to the test area.

In embodiments the vision system 8 is arranged above the testing facility 2 to survey the entire testing facility area. The vision system 8 may include a 2D/3D vision system with embedded conveyor tracking algorithms to be able to perform real-time, step by step coordinate extraction on the parcel P through the test path 14. Alternatively, the vision system 8 may include an event camera (again with embedded conveyor tracking algorithm).

In embodiments, a method for dynamic analysis of parcels P, according to the invention—which makes use of the hardware in the logistics facility 1—comprises:

feeding one or more randomly placed parcels P subjecting the one or more randomly placed parcels P to one or more predetermined test actions, retrieving the response of the one or more randomly placed parcels P to the one or more predetermined test actions, determining, as a function of the response to the one or more predetermined test actions, a parcel dynamics indicator, comparing the parcel dynamics indicator with one or more predetermined thresholds to retrieve a parcel classification.

The above method steps will now be disclosed in detail. Feeding one or more randomly placed parcels P is initiated by the parcel drop off at the input conveyor 2, which sets them into motion towards further processing stages in the feed direction F. Drop off is carried out exactly the same way as in prior art solution, i.e. with a courier or a carrier releasing the parcels P with no specific handling guidelines, neither in terms of drop off order, nor in terms of drop off care.

The randomly placed (one or more) parcels P then enter the testing facility 4, whereat they are subject to the one or more predetermined test actions. Such test actions include one or more predetermined actions that are exerted onto the parcels P to test dynamic behaviour thereof, and in preferred embodiments include negotiation of the test path 14.

In this regard, the parcels P are forced to negotiate the test path 14 by the facility 4 itself, for instance through the action of the controlled rollers 12 and/or the actuator(s) 16. Whatever the number of parcels P in the flow moving in the direction F, the method envisages to subject all of the parcels to the one or more test actions, particularly the negotiation of the test path 14.

The test actions serve to test the parcel dynamics and determine a parcel dynamics indicator for each of the parcels P as a function of the response to the test actions. More specifically, the dynamic response of each parcel P to the disparate test actions along the testing facility 4 is retrieved through the vision system 8. The latter is capable of retrieving spatial coordinates of the parcel P negotiating the test path 14 or subject to whatever sort of test action and refer them into the system X-Y-Z. This is also represented in a workflow chart 100 in FIG. 3, wherein steps 102 (acquisition by vision system 8) and 104 (feature extraction step, viz. retrieval of the dynamic response of the parcel P) correspond to the above.

An example of data acquired through the vision system 8 comprises coordinates X, Y of the parcel P, as well as an angle of rotation of the parcel P in the plane X-Y.

The features of the dynamic response of the parcels P are processed to define a parcel dynamics indicator (step 106), which may include deriving speed information and/or trajectory information and/or vibration information and/or flip-over information and/or slip/sideslip information from the parcels P. Processing—as schematically shown in FIG. 3, is done through the computer unit 10, preferably—as said—an AI server. The computer unit 10, to this end, may include neural network-based algorithm(s) 108 to process the feature of the dynamic response of the parcels P to derive the parcel dynamics indicator(s) and compare the same with predetermined thresholds to output a reference dynamic classification for the parcels P. the neural network based algorithm may, for instance, rely on an input layer 108A which receives the processed information from the dynamic response of the parcels P, one or more hidden layers 108B, and an output layer 108C which outputs a parcel classification here including, for instance, three classes: 110, which includes unstable parcels, 112, which includes undetermined parcels, 114, which includes stable parcels.

By way of example, determining the parcel dynamics indicator may comprises determining a maximum admissible accelerations of the parcel P based on the spatial coordinates X, Y, and the angle of rotation in the plane X-Y of the parcel along the test path 14, and associating a parcel P into one of 110, 112, 114 based on such admissible accelerations. A maximum admissible acceleration is the maximum acceleration the parcel can take when moving along a conveyor without experiencing flow disrupting phenomena such as a roll, a flip over, a slip, or excessive vibrations. Once through the testing facility 4, the parcels P move to the output conveyor 6 and are routed through specific paths further into the logistics facility. Thanks to the method according to the invention, a real time analysis of stability performance of the parcels P can be done before the parcels enter the above specific paths, so that the latter can be chosen based of stability performance of the parcels P. For instance, very unstable parcels P (110 range) may be routed through processing paths having lower processing speeds, or featuring different types of conveyors—for instance conveyors for fragile items, or else envisaging manual handling of the parcels P. repositioning of the parcel P in a position with a greater stability may also be envisaged, for instance with parcels for which stability largely depends on the orientation (for instance bottle containers or elongated parcels).

Overall, the method of the invention solves the technical problems of the prior art in that it achieves reduced jamming, reduced parcel drops and fall-overs through the facility 1, maximized conveyor speed, maximized throughput. Parcel mix up and parcel loss is also avoided thanks to the overall smoother operation of the logistics facility 1.

Naturally, while the principle of the invention remains the same, the details of construction and the embodiments may widely vary with respect to what has been described and illustrated purely by way of example, without departing from the scope of the present invention.

The invention claimed is:

1. A method for dynamic analysis of parcels, comprising:
feeding one or more randomly placed parcels, subjecting the one or more randomly placed parcels to one or more predetermined test actions, retrieving a dynamic response of the one or more randomly placed parcels to the one or more predetermined test actions, determining, as a function of the dynamic response to the one or more predetermined test actions, a parcel dynamics indicator, and comparing the parcel dynamics indicator with one or more predetermined thresholds to retrieve a parcel classification, which defines one of a number of predetermined classes of stability with respect to each parcel, number of levels of stability with respect to each parcel, wherein said one or more predetermined test actions comprise a negotiation of a test path, and wherein said test path comprises, individually or in combination, changes in direction, bends, accelerations and decelerations, and slope variations.

2. The method of claim 1, wherein said subjecting the one or more randomly placed parcels to the one or more predetermined test actions comprises subjecting each parcel to the one or more predetermined test actions.

3. The method of claim 1, wherein said determining a parcel dynamics indicator comprises determining a parcel dynamics indicator for each of the parcels.

4. The method of claim 1, wherein said retrieving the dynamic response of the one or more randomly placed parcels comprises retrieving spatial coordinates of the parcel along the test path.

5. The method claim 1, wherein said retrieving the dynamic response of the one or more randomly placed parcels is performed through one of:
a 2D/3D vision system, and
an event camera.

6. The method of claim 4, wherein said determining a parcel dynamics indicator comprises determining a maximum admissible acceleration of the parcel based on the spatial coordinates of the parcel along the test path.

7. The method of claim 6, wherein said comparing the parcel dynamics indicator with one or more predetermined thresholds to retrieve a parcel classification comprises comparing the maximum admissible accelerations with the one or more predetermined thresholds.

8. The method of claim 1, wherein said one or more predetermined test actions comprises applying transverse actions and/or vibration inputs by one or more actuators to the randomly placed parcels.

9. A logistics facility, comprising:
an input conveyor configured to receive and feed one or more randomly placed parcels, a testing facility downstream of the input conveyor, the testing facility being configured to receive the one or more randomly placed parcels fed by the input conveyor, an output conveyor downstream of the testing facility, a vision system associated to the testing facility, and a computer unit operatively connected to the vision system, wherein the testing facility is configured to impart one or more predetermined test actions to the one or more randomly placed parcels fed by said input conveyor, the one or more predetermined test actions comprising a negotiation of a test path, the test path comprising, individually or in combination, changes in direction, bends, accelerations and decelerations, and slope variations, wherein the vision system is configured to retrieve a dynamic response of the one or more randomly placed parcels to the one or more predetermined test actions, and wherein the computer unit is configured to determine, as a function of the dynamic response to the one or more predetermined test actions, a parcel dynamics indicator, and compare the parcel dynamics indicator with one or more predetermined thresholds to retrieve a parcel classification, which defines one of a number of predetermined classes of stability with respect to each parcel.

10. The logistics facility of claim 9, wherein the testing facility comprises an arrangement of controlled rolling elements configured to be selectively operated to rotate around axes of rotation that are selected based on features of the test path that are to be negotiated by a parcel of the one or more randomly placed parcels moving through the testing facility.

11. The logistics facility of claim 9, wherein the testing facility further comprises one or more actuators configured to apply transverse actions and/or vibration inputs to the one or more parcels moving along the testing facility.

12. The logistics facility according to claim 9, wherein said vision system comprises one of:
a 2D/3D vision system, and
an event camera.

13. The logistics facility according to claim 9, wherein the computer unit comprises an AI server featuring one or more neural network-based algorithms for determining the parcel dynamics indicator, and comparing the parcel dynamics indicator with the one or more predetermined thresholds to retrieve the parcel classification.

* * * * *

UNITED STATES PATENT AND TRADEMARK OFFICE
CERTIFICATE OF CORRECTION

| | | |
|---|---|---|
| PATENT NO. | : 11,969,761 B2 | Page 1 of 1 |
| APPLICATION NO. | : 17/682242 | |
| DATED | : April 30, 2024 | |
| INVENTOR(S) | : Diego Gualtieri and Anselmo Cicchitti | |

It is certified that error appears in the above-identified patent and that said Letters Patent is hereby corrected as shown below:

On the Title Page

Item (71) Applicant address information should be listed as:
- Fameccanica.Data S.p.A., San Giovanni Teatino (Chieti), ITALY -

Item (72) Inventor address information should be listed as:
- Diego GUALTIERI, San Giovanni Teatino (Chieti), ITALY
Anselmo CICCHITTI, San Giovanni Teatino (Chieti), ITALY -

Signed and Sealed this
Eighteenth Day of March, 2025

Coke Morgan Stewart
*Acting Director of the United States Patent and Trademark Office*